(12) United States Patent
Fukushima

(10) Patent No.: US 7,663,838 B2
(45) Date of Patent: Feb. 16, 2010

(54) PRODUCTION METHOD FOR MAGNETIC RECORDING MEDIUM

(75) Inventor: Masato Fukushima, Chiba (JP)

(73) Assignee: Showa Denko K.K., Tokyo (JP)

( * ) Notice: Subject to any disclaimer, the term of this patent is extended or adjusted under 35 U.S.C. 154(b) by 552 days.

(21) Appl. No.: 11/659,118

(22) PCT Filed: Jul. 28, 2005

(86) PCT No.: PCT/JP2005/014255

§ 371 (c)(1),
(2), (4) Date: Feb. 1, 2007

(87) PCT Pub. No.: WO2006/013908

PCT Pub. Date: Feb. 9, 2006

(65) Prior Publication Data

US 2009/0021860 A1    Jan. 22, 2009

Related U.S. Application Data

(60) Provisional application No. 60/602,645, filed on Aug. 19, 2004.

(30) Foreign Application Priority Data

Aug. 5, 2004    (JP)    ............................ 2004-229127

(51) Int. Cl.
G11B 5/127    (2006.01)

(52) U.S. Cl. ...................................................... 360/110
(58) Field of Classification Search .................. 360/110, 360/236.5, 125.62, 123.13, 125.02, 234.5, 360/123.39, 125.55, 318; 29/603.12, 603.16, 29/603.2, 603.26
See application file for complete search history.

(56) References Cited

U.S. PATENT DOCUMENTS 6,528,124 B1    3/2003    Nguyen
2005/0213372 A1*    9/2005    Nishikawa ................. 365/154

FOREIGN PATENT DOCUMENTS

| JP | 06-322538 A | 11/1994 |
|----|-------------|---------|
| JP | 8-134642 A  | 5/1996  |
| JP | 2000-265271 A | 9/2000 |
| JP | 2002-280443 A | 9/2002 |

* cited by examiner

Primary Examiner—Allen T Cao
(74) Attorney, Agent, or Firm—Sughrue Mion, PLLC

(57) ABSTRACT

A production method for a magnetic recording medium including forming thin films on a substrate using a sputtering method with a target, wherein the target on which an annular-shaped erosion area is formed during sputtering and a substrate holder on which a plurality of substrates are mounted are installed, opposed in parallel, in a manner such that center axes of the target and the substrate holder align with each other, and the substrates are mounted on the substrate holder in positions such that R3/R1 is 1.1 or smaller and R4 is R2 or greater to form thin films.

18 Claims, 4 Drawing Sheets

PRODUCTION METHOD FOR MAGNETIC RECORDING MEDIUM

Priority is claimed on Japanese Patent Application No. 2004-229127, filed Aug. 5, 2004, the content of which is incorporated herein by reference and priority is claimed on U.S. Provisional Application No. 60/602645, filed Aug. 19, 2004, the content of which is incorporated herein by reference.

TECHNICAL FIELD

The present invention relates to a production method for a magnetic recording medium, in particular, it relates to a production method for a magnetic recording medium of which variations in film the thickness distribution are small.

BACKGROUND ART

Recently, the packing density of hard disk drives (HDDs), which are a magnetic recorder and reproducing devices, has improved considerably, and now even the packing density of mass-produced HDDs has reached 80 Gbpsi (gigabits per square inch). Thus, even small HDDs have high capacity. For example, 80 Gbpsi can realizes a capacity of 6 GB for a 1-inch HDD.

Realizing high recording capacity for a small size of about 1 inch makes wide application to mobile applications such as mobile phones, mobile music players, and personal digital assistances (PDAs) possible. Already mobile music players on which a 1-inch HDD is mounted are being sold, and certain new markets have been developed.

For a magnetic recording medium for hard disk drives, a structure in which that metal films are laminated on a substrate for a magnetic recording medium by a sputtering method commonly known. Aluminum substrates and glass substrates are widely used as substrates for magnetic recording medium. Aluminum substrates consist of a mirror-polished base made of an Al—Mg alloy on which an alloy film consisting of a Ni—P type is formed by electroless plating, the alloy film being about 10 µm in thickness, and the surface thereof being further mirror-finished. Glass substrates are of two kinds, an amorphous glass and glass-ceramics. Glass substrates of each kind are mirror-finished.

In the hard disk drive for the magnetic recording medium now commonly used, a non-magnetic primary layer (an alloy of a Ni—Al type, Cr, an alloy of a Cr type or the like), a non-magnetic intermediate layer (an alloy of a Co—Cr or Co—Cr—Ta type or the like), a magnetic layer (an alloy of a Co—Cr—Pt—Ta or Co—Cr—Pt—B type or the like), and a protective layer (carbon or the like) are deposited in sequence on the glass substrate or the aluminum substrate, and a lubricating film which is composed of a liquid lubricant is formed thereon.

As for a method to efficiently produce the magnetic recording medium with a small diameter, for example, Patent Reference 1 discloses a method in which a plurality of small substrates are attached to a disk carrier and are formed by deposition simultaneously by sputtering, and Patent Reference 2 discloses a method in which a palette is rotated when a plurality of substrates are attached to the palette and are deposited simultaneously.

Patent Reference 1: Japanese Unexamined Patent Application, First Publication No. 2002-280443
Patent Reference 2: Japanese Unexamined Patent Application, First Publication No. 2000-265271

As disclosed in Patent Reference 1, a plurality of substrates are mounted on a substrate holder, and by performing film deposition on these substrates simultaneously, the productivity of a small magnetic recording medium can be enhanced; however, the properties of the produced magnetic recording medium vary with the surface. This is because a disk-like target and a center axis of a plurality of substrates do not align with each other, so that there is a distribution in film thickness deposited on the surface of the substrate. To solve these problems, the method disclosed in Patent Reference 2 rotates the substrate holder during the film deposition, however, the structure of the substrate holder becomes complex. Thus, plasma generated during sputtering becomes unstable, causing the properties of the magnetic film to decrease, and dust from a complex rotating structure causes production yields of the magnetic recording medium to decrease.

DISCLOSURE OF INVENTION

The present invention solves these problems and provides a production method for a magnetic recording medium in which a plurality of magnetic recording mediums can be produced with high productivity, variations in electromagnetic conversion properties on a surface of a magnetic recording medium are small, and production yields are high.

The inventor of the present invention carried out extensive examination to solve the above-stated problems, and as a result completed the present invention. The present invention is as follows:

(1) A production method for a magnetic recording medium including forming thin films on a substrate by using a sputtering method with a target, wherein the target on which an annular-shaped erosion area is formed during sputtering and a substrate holder on which a plurality of substrates are mounted are disposed, opposed in parallel, in a manner such that the center axes of the target and the substrate holder conform with each other, and the substrates are mounted on the substrate holder in positions such that R3/R1 is 1.1 or smaller and R4 is R2 or greater to form thin films, where R1 is a distance from a deepest recess in the annular-shaped erosion area to the center of the target, R2 is a distance from an innermost circumference of the annular-shaped erosion area to the center of the target, R3 is a longest distance from an end of an outside diameter of a substrate to the center of the substrate holder, and R4 is a shortest distance from the end of the outside diameter of the substrate to the center of the substrate holder;

(2) The production method for a magnetic recording medium according to item (1) stated above, wherein R2/R1 is 0.4 or smaller;

(3) The production method for a magnetic recording medium according to item (1) or (2) stated above, wherein the plurality of substrates are mounted at an equal distance from the center of the substrate holder;

(4) The production method for a magnetic recording medium according to any one of items (1) to (3) stated above, wherein the plurality of substrates are mounted in concentric circles about the center of the substrate holder at regular intervals;

(5) The production method for a magnetic recording medium according to any one of items (1) to (4) stated above, wherein the number of the substrates mounted on the substrate holder is within the range of 4 to 7;

(6) A magnetic recording medium produced by the production method for a magnetic recording medium according to any one of items (1) to (5) stated above, wherein envelope modulation is 7 percent or smaller; and (7) A magnetic recorder and reproducing device including the magnetic recording medium according to item (6) stated above and a magnetic head for recording and reproducing information on the magnetic recording medium.

The present invention provides a magnetic recording medium which has small variations in electromagnetic properties in a surface and has a small diameter, and can manufacture such a magnetic recording medium efficiently and stably.

BEST MODE FOR CARRYING OUT THE INVENTION

In the present invention, when, for example, a primary layer of Cr, a magnetic layer of an alloy Co, and a protective film of carbon are deposited by a sputtering method to produce a magnetic recording medium on a substrate, the substrate and a target for the sputtering are in a specific alignment with one another.

The present invention will now be explained with reference to the drawings.

Figure 1:
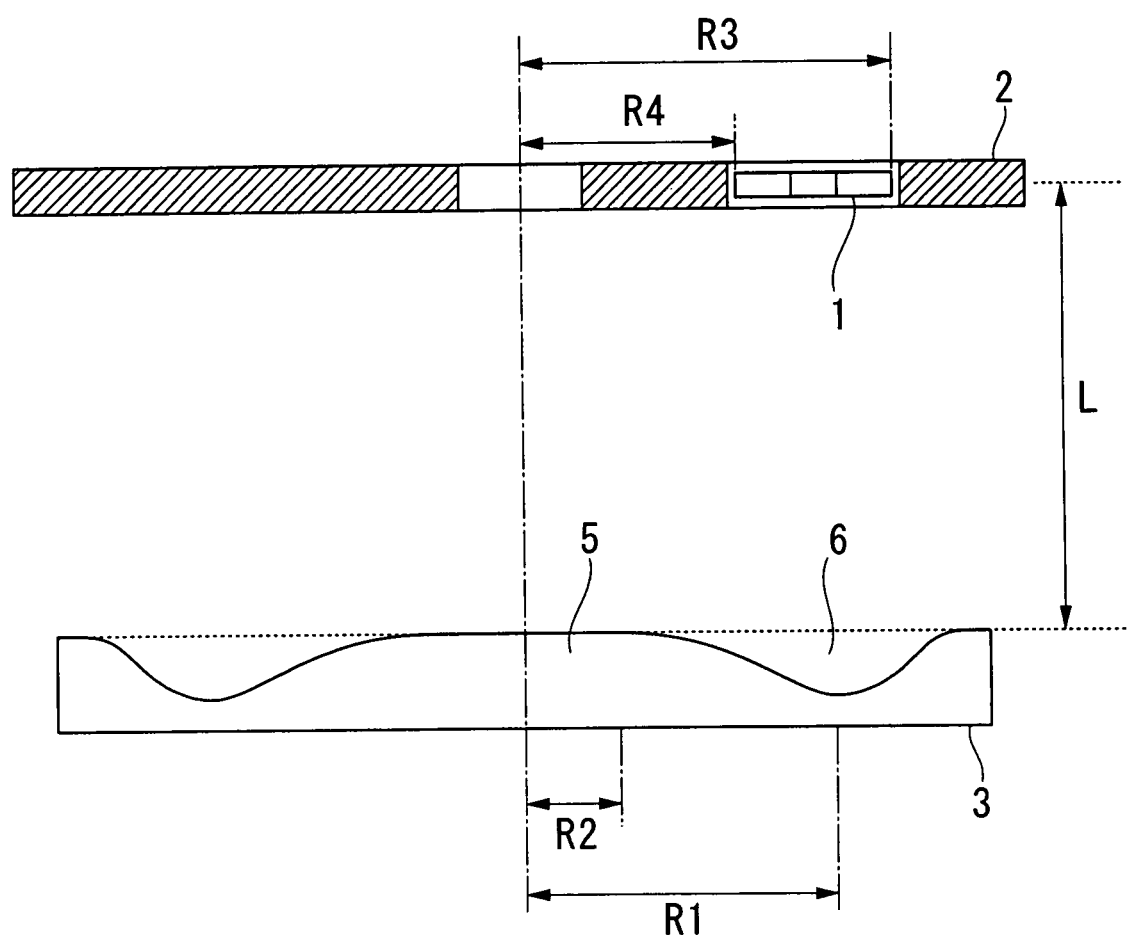
FIG. 1 is a cross-sectional view along line A-A' in FIG. 2 and a target 5 located thereunder.
Figure 2:
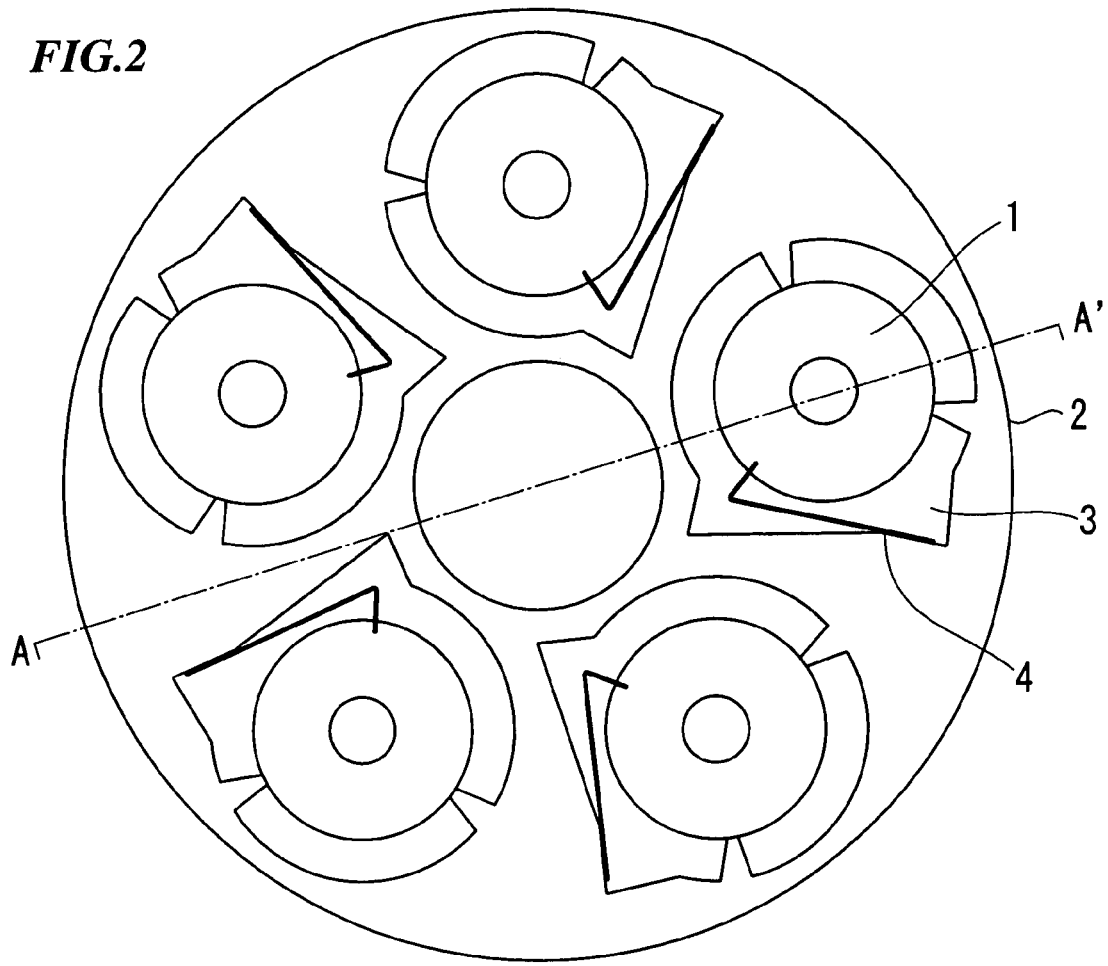
FIG. 2 is a plan view of the substrate holder on which a plurality of substrates are mounted.

FIG. 2 is a plan view of a substrate holder 2 on which a plurality of substrates 1 are mounted. The reference numeral 3 denotes an opening into which the substrate is inserted. The reference numeral 4 denotes a flat spring to secure the substrate. FIG. 1 is a cross-sectional view along line A-A' in FIG. 2 and a target 5 located thereunder. An annular-shaped erosion area 6 is formed on the target 5 during the sputtering.

The target on which the annular-shaped erosion area is formed during the sputtering and the substrate holder on which the plurality of substrates are mounted are disposed, opposed in parallel, in a manner such that the center axes thereof are aligned with each other. As shown in FIG. 1, the substrates are mounted in a position such that R3/R1 is 1.1 or smaller and R4 is R2 or greater to form thin films where a distance from a deepest recess in the annular-shaped erosion area to the center of the target is R1, a distance from an innermost circumference of the annular-shaped erosion area to the center of the target is R2, a longest distance from an end of an outside diameter of the substrate to the center of the substrate holder is R3, and a shortest distance is R4.

By performing film deposition with the substrate disposed on this position, even though the target and the center axes of a plurality of substrates do not align with each other, and even though the one target is used to perform the film deposition on a plurality of substrates simultaneously, a production method for a magnetic recording medium can be provided, in which variations in the electromagnetic conversion properties in a surface of a produced magnetic recording medium are small and variations in the electromagnetic conversion properties between the magnetic recording mediums are also small.

The above-stated annular-shaped erosion area of the target is an area eroded by the release of particular sputtering particles on a surface of the target, when the target is sputtered by plasma discharge. When the target is in the form of a disk, the erosion area appears in an annular shape as shown in the cross-sectional view of FIG. 1.

In the present invention, R3/R1 is 1.1 or smaller, more preferably, R3/R1 is 1.05 or smaller. Moreover, a lower limit of R3/R1 is 0.6, preferably. When R3/R1 is greater than 1.1, variations in the film thickness in the surface of the magnetic recording medium occur, and variations in magnetic properties also occur.

Also in the present invention, R4 is R2 or greater. When R4 is smaller than R2, variations in the film thickness in the surface of the magnetic recording medium occur, and variations in magnetic properties also occur.

In the present invention, R2/R1 is preferably 0.4 or smaller, more preferably, R2/R1 is 0.35 or smaller. When R2/R1 is greater than 0.4, the film thickness distribution occurs in the surface, and abnormal SNR and abnormal modulation occur. To make R2/R1 0.4 or smaller, when DC magnetron sputtering is used for deposition, the size of a magnet of a cathode used for sputtering is increased, or by rotating the magnet, a wide range of the surface of the target can be exposed to plasma, but other known methods can be used.

In the present invention, when a plurality of substrates are mounted on the substrate holder, as shown in FIG. 2, each substrate is preferably mounted at an equal distance from the center of the substrate holder. By mounting the substrates in this way, variations between the substrates mounted on the same substrate holder can be avoided.

Also in the present invention, as shown in FIG. 2, a plurality of substrates are preferably mounted on concentric circles about the center of the substrate holder at regular intervals. By mounting the substrates in this way, uniformity of the plasma distributed on both sides of the substrate holder is achieved, and variations between the substrates mounted on the same substrate holder can be further suppressed.

In the present invention, the number of substrates mounted on the substrate holder is preferably within the range of 4 to 7.

Concrete dimensions of the substrates, the substrate holder, and the target in the production method of the magnetic recording medium according to the present invention are, for example, as follows: the diameter of the substrates is preferably 10 mm to 40 mm, more preferably, 20 mm to 30 mm; the diameter of the substrate holder is preferably 80 mm to 160 mm, more preferably, 80 mm to 120 mm; the diameter of the target is preferably 100 mm to 240 mm, more preferably, 120 mm to 200 mm; the distance between the substrate and the target (value L in FIG. 1) is preferably 10 mm to 60 mm, more preferably, 20 mm to 50 mm. More preferably, when the diameter of the substrate holder is 95 mm and the inner circumference thereof is 25 mm, the same size as magnetic disks, the substrate holder with the substrates attached can be handled in the same manner as ordinary magnetic disks, so that an existing sputtering apparatus can be used when the film deposition is performed on small disks.

Magnetic recording medium produced using the production method for the magnetic recording medium according to the present invention are preferably used in small magnetic recorder and reproducing devices. In other words, a magnetic recorder and reproducing device, including a magnetic recording medium produced by the production method according to the present invention, a medium driver for rotating and driving the magnetic recording medium, a magnetic head for recording and reproduction of information on the magnetic recording medium, a head driver, and a recording and reproduction-signal-processing system, can be produced, wherein the recording and reproduction-signal-processing system processes input data to send a record signal to the magnetic head and processes a reproduction signal from the magnetic head to process data.

EXAMPLES

The present invention will be explained by means of the following examples as follows, however, the present invention is not limited to these.

A magnetic recording medium was made by the following procedures and the electromagnetic conversion properties were evaluated.

Cleansed glass substrates with a diameter of 21.6 mm and 27.4 mm were mounted on a substrate holder. Openings were formed on the substrate holder to mount the substrates at desired positions. The openings were formed in such a way that the centers of the substrates to be mounted were 20 mm to 65 mm from the center of the substrate holder. On the substrate holder, five substrates with a diameter of 21.6 mm and four substrates with a diameter of 27.4 mm were able to be mounted.

The substrates mounted on the substrate holder were set in a chamber of a DC-magnetron-sputtering apparatus (made of Anelva Co., C-3010). The target used was 180 mm in diameter, and R1 and R2 were changed by varying the size of a magnet of a DC magnetron cathode to perform film deposition.

After exhausting air from the chamber to a degree of vacuum of $1 \times 10^{-6}$ Pa, Ar of 0.6 Pa was introduced to perform sputtering. In detail, Cr35Ta (film thickness of 200 angstroms (20 nm)), NiAl (film thickness of 200 angstroms (20 nm)), Cr20Ti (film thickness of 50 angstroms (5 nm)), Co13Cr6Pt (film thickness of 20 angstroms (2 nm)), Ru (film thickness of 8 angstroms (0.8 nm)), Co22Cr14Pt6B (film thickness of 80 angstroms (8 nm)), Co14Cr12Pt12B (film thickness of 70 angstroms (7 nm)), and diamond-like carbon (film thickness of 30 angstroms (3 nm)) were deposited. In the composition of the above-stated alloy, numbers denote the percent by mass of the element following the percentage. For example, Cr35Ta denotes 35% by mass of Ta and the remainder Cr. The lack of a number indicates equal proportions.

After that, the substrates were taken out from the chamber, and a lubricating film of 20 angstroms (20 nm) of perfluoropolyether was formed thereon by a dipping method to form a magnetic recording medium.

The electromagnetic conversion properties of the magnetic recording medium were evaluated. Evaluation conditions were as follows.

Figure 3:
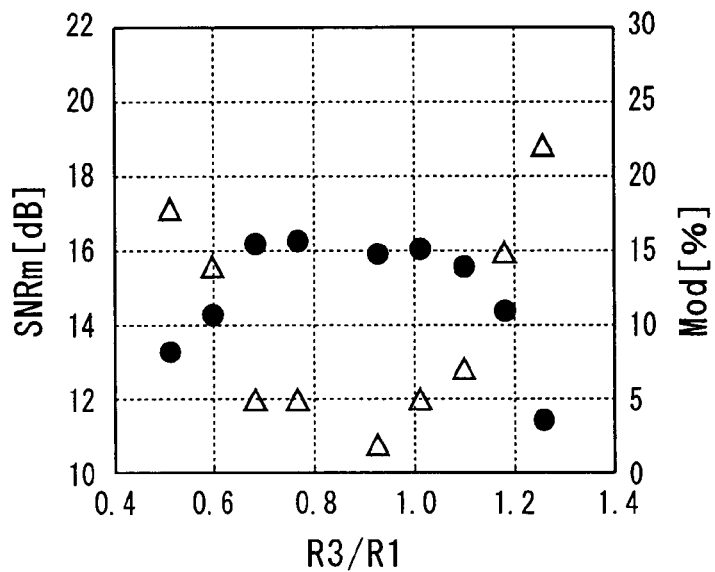
FIG. 3 is a graph showing relationships between R3/R1 and SNRm and between R3/R1 and Mod of Table 1.
Figure 4:
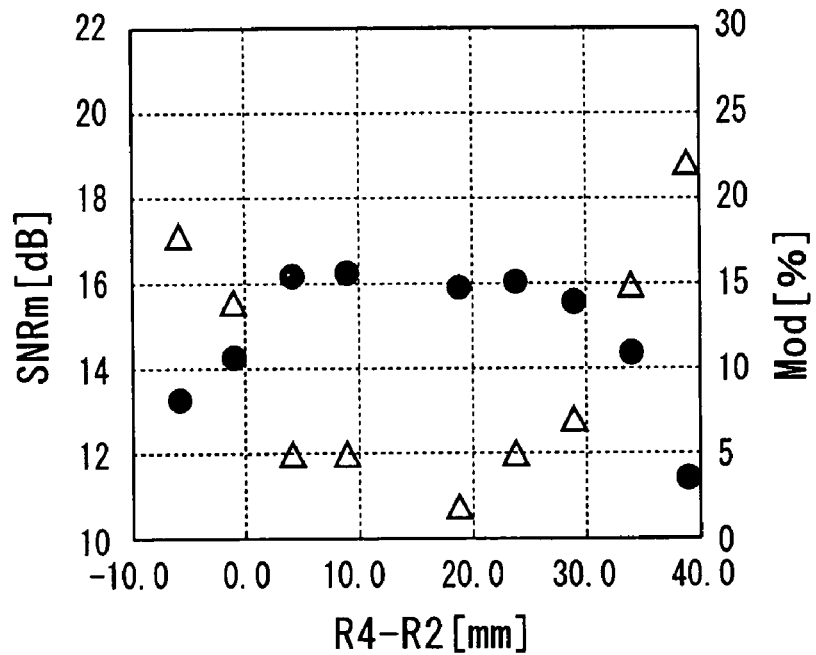
FIG. 4 is a graph showing relationships between R4-R2 and SNRm and between R4-R2 and Mod of Table 1.
Figure 5:
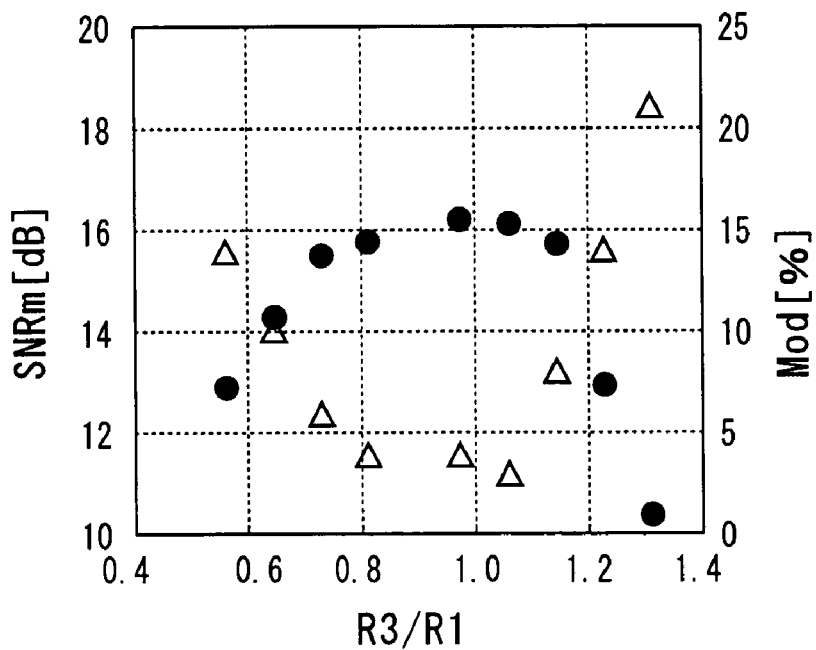
FIG. 5 is a graph showing relationships between R3/R1 and SNRm and between R3/R1 and Mod of Table 2.
Figure 6:
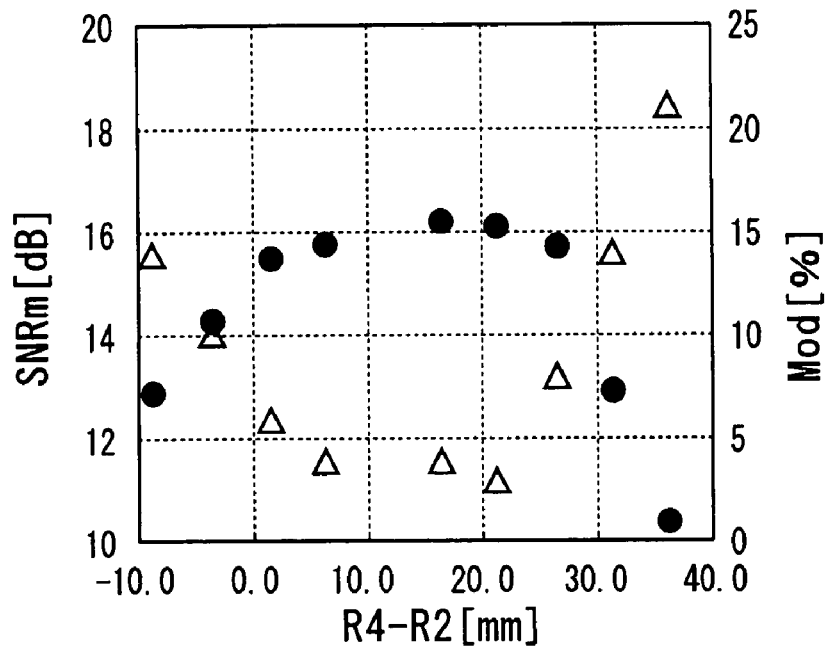
FIG. 6 is a graph showing relationships between R4-R2 and SNRm and between R4-R2 and Mod of Table 2.
Figure 7:
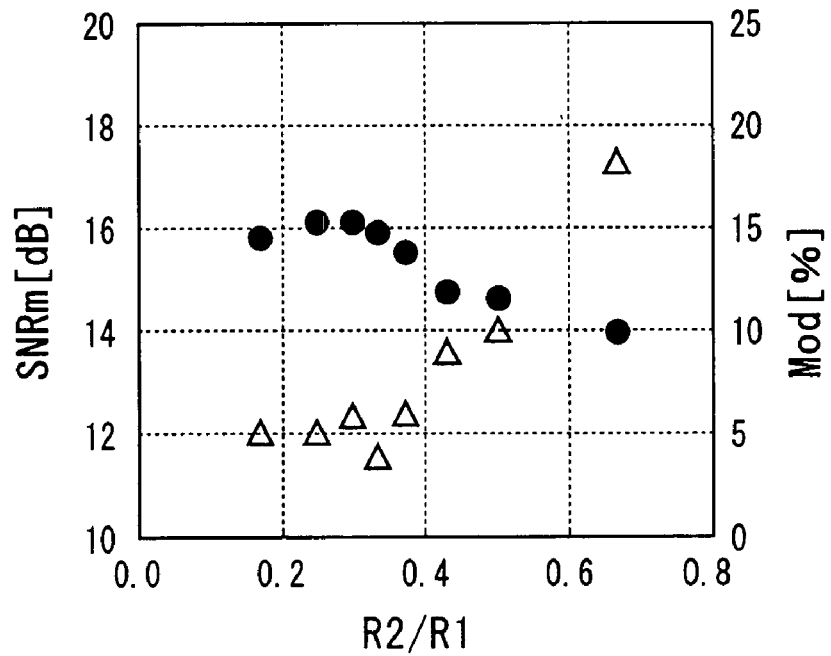
FIG. 7 is a graph showing relationships between R2/R1 and SNRm and between R2/R1 and Mod of Table 3.

(Evaluation Conditions)
Tester: Made by GUZIK Co., RWA1632
Spin stand: Made by GUZIK Co., S1701MP
Spindle revolution speed: 8369 rpm
Measurement diameter: 8 mm
HF: 114.32 MHz
MF: 57.16 MHz
LF: 9.53 MHz
Iw: 50 mA
Head: Writing width was 0.26 μm; reading width was 0.19 μm.
Packing density: 830 kFCI
LF-kFCI: 69.2 kFCI The results are shown in Tables 1 to 3. FIG. 3 is a graph showing a relationship between R3/R1 of Table 1 and SNRm and Mod. FIG. 3 is a graph showing relationships between R3/R1 and SNRm and between R3/R1 and Mod of Table 1. FIG. 4 is a graph showing relationship between R4-R2 and SNRm and between R4-R2 and Mod of Table 1. FIG. 5 is a graph showing relationships between R3/R1 and SNRm and between R3/R1 and Mod of Table 2. FIG. 6 is a graph showing relationships between R4-R2 and SNRm and between R4-R2 and Mod of Table 2. FIG. 7 is a graph showing relationships between R2/R1 and SNRm and between R2/R1 and Mod of Table 3. The mark • in the figures corresponds to the left vertical axis; and the mark Δ corresponds to the right vertical axis. Mod denotes the regulation (envelope modulation) of an output signal in a track circuit, and SNRm denotes media noise. By performing the film deposition within the scope of the present invention, variations (envelope modulation) in the electromagnetic conversion properties in a circuit around the circumference are small, so that a magnetic recording medium with stable electromagnetic conversion properties can be produced.

TABLE 1

| | Diameter of Substrate [mm] | R1 [mm] | R2 [mm] | R3 [mm] | R4 [mm] | R3/R1 | R2/R1 | R4-R2 [mm] | SNRm [dB] | Mod [%] |
|---|---|---|---|---|---|---|---|---|---|---|
| Comparative Example 1 | 21.6 | 60 | 15 | 75.8 | 54.2 | 1.26 | 0.25 | 39.2 | 11.5 | 22 |
| Comparative Example 2 | 21.6 | 60 | 15 | 70.8 | 49.2 | 1.18 | 0.25 | 34.2 | 14.4 | 15 |
| Example 1 | 21.6 | 60 | 15 | 65.8 | 44.2 | 1.10 | 0.25 | 29.2 | 15.6 | 7 |
| Example 2 | 21.6 | 60 | 15 | 60.8 | 39.2 | 1.01 | 0.25 | 24.2 | 16.1 | 5 |
| Example 3 | 21.6 | 60 | 15 | 55.8 | 34.2 | 0.93 | 0.25 | 19.2 | 15.9 | 2 |
| Example 4 | 21.6 | 60 | 15 | 45.8 | 24.2 | 0.76 | 0.25 | 9.2 | 16.3 | 5 |
| Example 5 | 21.6 | 60 | 15 | 40.8 | 19.2 | 0.68 | 0.25 | 4.2 | 16.2 | 5 |
| Comparative Example 3 | 21.6 | 60 | 15 | 35.8 | 14.2 | 0.60 | 0.25 | -0.8 | 14.3 | 14 |
| Comparative Example 4 | 21.6 | 60 | 15 | 30.8 | 9.2 | 0.51 | 0.25 | -5.8 | 13.3 | 18 |

TABLE 2

| | Diameter of Substrate [mm] | R1 [mm] | R2 [mm] | R3 [mm] | R4 [mm] | R3/R1 | R2/R1 | R4-R2 [mm] | SNRm [dB] | Mod [%] |
|---|---|---|---|---|---|---|---|---|---|---|
| Comparative Example 5 | 27.4 | 60 | 15 | 78.7 | 51.3 | 1.31 | 0.25 | 36.3 | 10.4 | 21 |
| Comparative Example 6 | 27.4 | 60 | 15 | 73.7 | 46.3 | 1.23 | 0.25 | 31.3 | 12.9 | 14 |
| Comparative Example 7 | 27.4 | 60 | 15 | 68.7 | 41.3 | 1.15 | 0.25 | 26.3 | 15.7 | 8 |
| Example 6 | 27.4 | 60 | 15 | 63.7 | 36.3 | 1.06 | 0.25 | 21.3 | 16.1 | 3 |
| Example 7 | 27.4 | 60 | 15 | 58.7 | 31.3 | 0.98 | 0.25 | 16.3 | 16.2 | 4 |
| Example 8 | 27.4 | 60 | 15 | 48.7 | 21.3 | 0.81 | 0.25 | 6.3 | 15.8 | 4 |
| Example 9 | 27.4 | 60 | 15 | 43.7 | 16.3 | 0.73 | 0.25 | 1.3 | 15.5 | 6 |
| Comparative Example 8 | 27.4 | 60 | 15 | 38.7 | 11.3 | 0.65 | 0.25 | -3.7 | 14.3 | 10 |
| Comparative Example 9 | 27.4 | 60 | 15 | 33.7 | 6.3 | 0.56 | 0.25 | -8.7 | 12.9 | 14 |

TABLE 3

| | Diameter of Substrate [mm] | R1 [mm] | R2 [mm] | R3 [mm] | R4 [mm] | R3/R1 | R2/R1 | R4-R2 [mm] | SNRm [dB] | Mod [%] |
|---|---|---|---|---|---|---|---|---|---|---|
| Comparative Example 10 | 21.6 | 60 | 40 | 45.8 | 24.2 | 0.67 | 0.67 | -15.8 | 13.9 | 18 |
| Comparative Example 11 | 21.6 | 60 | 30 | 45.8 | 24.2 | 0.50 | 0.50 | -5.8 | 14.6 | 10 |
| Example 9 | 21.6 | 60 | 20 | 45.8 | 24.2 | 0.33 | 0.33 | 4.2 | 15.9 | 4 |
| Example 10 | 21.6 | 60 | 15 | 45.8 | 24.2 | 0.25 | 0.25 | 9.2 | 16.1 | 5 |
| Example 11 | 21.6 | 60 | 10 | 45.8 | 24.2 | 0.17 | 0.17 | 14.2 | 15.8 | 5 |
| Example 12 | 21.6 | 50 | 15 | 45.8 | 24.2 | 0.30 | 0.30 | 9.2 | 16.1 | 6 |
| Example 13 | 21.6 | 40 | 15 | 45.8 | 24.2 | 0.38 | 0.38 | 9.2 | 15.5 | 6 |
| Comparative Example 12 | 21.6 | 35 | 15 | 45.8 | 24.2 | 0.43 | 0.43 | 9.2 | 14.7 | 9 |

INDUSTRIAL APPLICABILITY

The magnetic recording medium according to the present invention has small variations in the electromagnetic conversion properties in a surface, so that it can be preferably used as a small magnetic recorder and reproducing device, for example, in mobile phones, and mobile music players.

The invention claimed is:

1. A production method for a magnetic recording medium comprising:
    forming thin films on a substrate using a sputtering method with a target,
    wherein the target on which an annular-shaped erosion area is formed during sputtering and a substrate holder on which a plurality of substrates are mounted are installed, opposed in parallel, in a manner such that center axes of the target and the substrate holder align with each other, and the substrates are mounted on the substrate holder in positions such that R3/R1 is 1.1 or smaller and R4 is R2 or greater to form thin films, where R1 is a distance from a deepest recess in the annular-shaped erosion area to the center of the target, R2 is a distance from an innermost circumference of the annular-shaped erosion area to the center of the target, R3 is a longest distance from an end of an outside diameter of a substrate to the center of the substrate holder, and R4 is a shortest distance from the end of the outside diameter of the substrate to the center of the substrate holder.

2. The production method for a magnetic recording medium according to claim 1,
    wherein R2/R1 is 0.4 or smaller.

3. The production method for a magnetic recording medium according to claim 1,
    wherein the plurality of substrates are mounted at an equal distance from the center of the substrate holder.

4. The production method for a magnetic recording medium according to claim 2,
    wherein the plurality of substrates are mounted at an equal distance from the center of the substrate holder.

5. The production method for a magnetic recording medium according to claim 1,
    wherein the plurality of substrates are mounted in concentric circles about the center of the substrate holder at regular intervals.

6. The production method for a magnetic recording medium according to claim 2,
    wherein the plurality of substrates are mounted in concentric circles about the center of the substrate holder at regular intervals.

7. The production method for a magnetic recording medium according to claim 3,
    wherein the plurality of substrates are mounted in concentric circles about the center of the substrate holder at regular intervals.

8. The production method for a magnetic recording medium according to claim 4,
    wherein the plurality of substrates are mounted in concentric circles about the center of the substrate holder at regular intervals.

9. The production method for a magnetic recording medium according to claim 1, wherein the number of the substrates mounted on the substrate holder is within the range of 4 to 7.

10. The production method for a magnetic recording medium according to claim 2,
wherein the number of the substrates mounted on the substrate holder is within the range of 4 to 7.

11. The production method for a magnetic recording medium according to claim 3,
wherein the number of the substrates mounted on the substrate holder is within the range of 4 to 7.

12. The production method for a magnetic recording medium according to claim 4,
wherein the number of the substrates mounted on the substrate holder is within the range of 4 to 7.

13. The production method for a magnetic recording medium according to claim 5,
wherein the number of the substrates mounted on the substrate holder is within the range of 4 to 7.

14. The production method for a magnetic recording medium according to claim 6,
wherein the number of the substrates mounted on the substrate holder is within the range of 4 to 7.

15. The production method for a magnetic recording medium according to claim 7,
wherein the number of the substrates mounted on the substrate holder is within the range of 4 to 7.

16. The production method for a magnetic recording medium according to claim 8,
wherein the number of the substrates mounted on the substrate holder is within the range of 4 to 7.

17. A magnetic recording medium produced by the production method for a magnetic recording medium according to claim 1,
wherein envelope modulation is 7 percent or smaller.

18. A magnetic recorder and reproducing device comprising:
the magnetic recording medium according to claim 17, and
a magnetic head for recording and reproducing information on the magnetic recording medium.

* * * * *